United States Patent [19]

Rogan

[11] Patent Number: 4,765,029
[45] Date of Patent: Aug. 23, 1988

[54] PATTY-FORMING METHOD AND APPARATUS

[76] Inventor: Norbert L. Rogan, 305-1330 Hornby St., Van Couver, British Columbia, Canada, V6Z 1W5

[21] Appl. No.: 14,874

[22] Filed: Feb. 17, 1987

[51] Int. Cl.⁴ ................................................ A22C 7/00
[52] U.S. Cl. ...................................... 17/32; 425/298; 425/444
[58] Field of Search ...................... 17/32; 425/298, 444

[56] References Cited

U.S. PATENT DOCUMENTS

| | | | |
|---|---|---|---|
| Re. 24,935 | 2/1961 | Glenny | 17/32 X |
| 1,069,509 | 8/1913 | Winn | 17/32 |
| 1,183,731 | 5/1916 | Hopkins | 17/32 X |
| 1,530,189 | 3/1925 | Miller et al. | 17/32 |
| 1,808,993 | 6/1931 | Murray | 17/32 |
| 2,052,510 | 8/1936 | Woolverton | 17/32 X |

*Primary Examiner*—Willie G. Abercrombie
*Attorney, Agent, or Firm*—Barrigar & Oyen

[57] ABSTRACT

An adjustable food forming device for producing individual patties from foods, such as ground meat and the like and a method for using such device. A circumferential cutting means such as a mold cup containing a patty ejector or mold plate and a thickness adjustment means is provided. The circumferential cutting means has a sleeve connected thereto which extends upwardly from the mold cup. A shaft extends upwardly from the center of the mold plate within the sleeve. The height of the mold plate relative to the base of the mold cup determines the thickness of the patty to be produced. The height is determined by the arrangement of a key protruding from the wall of one of the plunger shaft or sleeve member, the key being slidably engaged in one of a plurality of keyways of differing lengths inscribed in the wall of the other of the sleeve member or plunger shaft.

7 Claims, 3 Drawing Sheets

PATTY-FORMING METHOD AND APPARATUS

INTRODUCTION

This invention relates to food forming devices and the like and, in particular, to such a device which is suitable for producing individual hamburger patties.

A variety of moldable foods similar to ground meat such as fish, aspic, cookies, cakes and the like are often prepared by shaping them into patty form prior to being cooked or served. While the present invention has been discussed in the context of ground meat and hamburger patties, the apparatus may be used with many other types of similar food material.

BACKGROUND OF THE INVENTION

The conventional method for preparing hamburger patties involves the steps of obtaining the ground meat, dividing the meat into roughly equal portions, forming these portions by hand into separate, roughly circular flat disc-shaped patties and then transferring the formed patties to the cooking surface. For the person preparing the meal, this method is time-consuming and tedious particularly if a large number of patties are desired. The meat must be continually handled by the person preparing the food which creates the risk of contamination if the conditions of preparation are not sanitary. The patties formed are often non-uniform in dimension and weight. Furthermore, because the pressure that can be applied in forming the meat into patties is limited, the cohesiveness of the meat is often poor which may cause the patties to fall apart during cooking, particularly where patties of small thickness are desired.

SUMMARY OF THE INVENTION

According to the invention, there is disclosed a patty molding tool comprising a circumferential cutting means, a patty ejector within said circumferential cutting means and a thickness adjustment means, said thickness adjustment means allowing said patty ejector to assume one of at least two pre-determined positions, said thickness adjustment means comprising a key moveable within and relative to one of at least two keyways, the length of said first keyway corresponding to said first pre-determined positions and the length of the second of said keyways corresponding to the second of said pre-determined positions.

According to a further aspect of the invention, there is disclosed a method for producing patties comprising the steps of placing a quantity of moldable food on a generally flat working surface, adjusting a thickness adjustment means by engaging a key within one of at least two keyways, each of said keyways corresponding to a respective thickness of the patty desired, placing the circumferential cutting edge of a cutting tool in contact with said food, applying pressure downward on said tool until said circumferential cutting edge contacts said working surface, releasing the pressure applied on said cutting tool, lifting said cutting tool and applying pressure on an ejector means to release said patty from said tool.

BRIEF DESCRIPTION OF THE SEVERAL VIEWS OF THE DRAWINGS

An embodiment of the invention will now be described, by way of example only, with the use of drawings in which.

DESCRIPTION OF SPECIFIC EMBODIMENT

Figure 1:
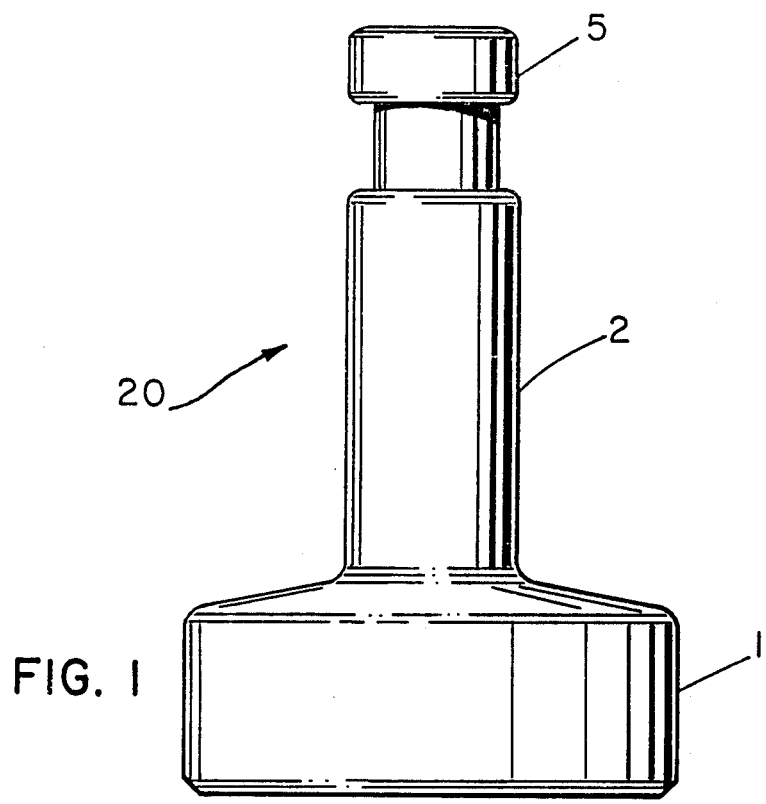
FIG. 1 is a side elevation view of the apparatus according to the invention.
Figure 2:
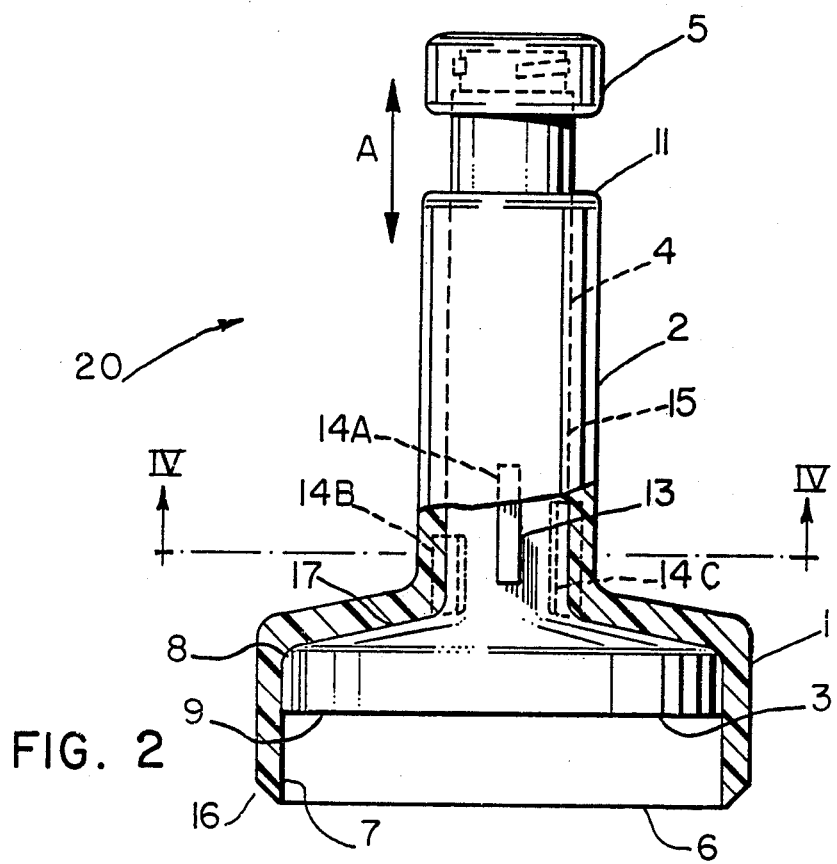
FIG. 2 is a side view similar to FIG. 1 but illustrating the mold plate in phantom.

Referring now to the drawings, a patty-forming apparatus is shown generally at 20 in FIGS. 1 and 2. It comprises of a circumferential cutting means or mold cup 1, a handle grip sleeve 2, a patty ejector or mold plate 3, a plunger shaft 4 connected to the mold plate 3 and a retaining cap 5 attached to the plunger shaft 4.

The mold cup is in the form of a hollow cylindrical sleeve-like member with the bottom portion having an internal dimension similar to the size of the patty to be formed. The internal wall 7 of the mold cup 1 rises generally vertically until it meets the shoulder 8. It then extends inwardly until it reaches the outside of the plunger shaft 4.

The depth of the mold cup 1, being the distance from the rim 6, to the shoulder 8, exceeds the total height of the maximum thickness of the patty to be formed. The actual patty thickness is determined by the effective mold cup depth, being the distance from the rim 6 to the lower surface 9 of the mold plate 3. This dimension is adjustable by means of the movement of the mold plate 3 in a manner to be later explained.

From the shoulder 8, the sleeve tapers to and is in communication with an upper portion 2 of a smaller diameter, the bore of which is sufficiently large as to allow the plunger shaft 4 to reciprocate slidably therein. The upper sleeve portion 2 is of an external diameter sufficiently large as to be suited to be held circumferentially in the hand of the operator. A threaded retaining cap 5 is secured to that portion of the plunger shaft 4 which extends beyond the upper sleeve 2 and which portion is threaded so as to receive the retaining cap 5.

The plunger shaft 4 and mold plate 3 form a continuous sub-assembly 21 fitting securely within the hollow interior of the sleeve 2 and mold cup 1 which parts form a second sub-assembly. The transverse cross sectional shape of the mold plate 3 is the same as the shape of the mold cup 1 but with a diameter slightly less than that of the mold cup 1. The mold plate 3 is free to move slidably perpendicular to the walls of the mold cup 1 as shown by A in FIG. 2. The outer edge of the mold plate 3 is sufficiently close to wall 7 so as to prevent any of the food placed in the cup 1 from going beyond the edge of the mold plate 3. The mold plate 3 is fixed at its centre with an upwardly projecting plunger shaft 4 which extends through and is slidably disposed to reciprocate within the hollow sleeve 2. The plunger shaft 4 terminates at a threaded end 12 onto which the retaining cap 5 is secured. Plunger shaft 4 may be depressed by exerting downward pressure on the top of the retaining cap 5 and in so doing eject the patty held within the mold cup 1. By releasing the retaining cap 5, the plunger sub-assembly may be removed from the device to facilitate cleaning.

Figure 4:
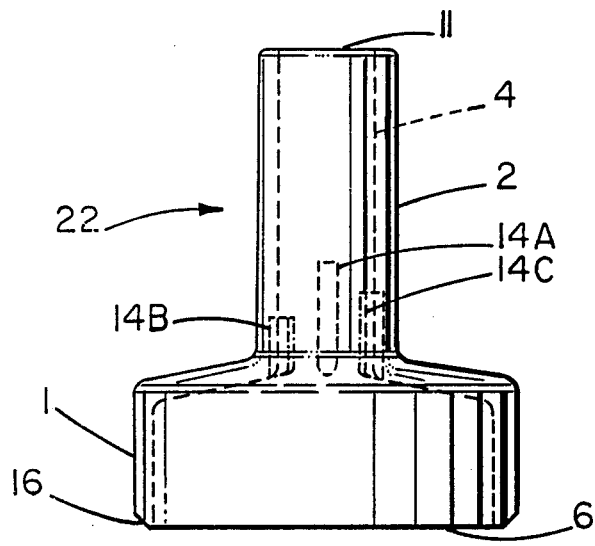
FIG. 4 is a side view of the mold cup and handle grip sleeve sub-assembly.
Figure 3:
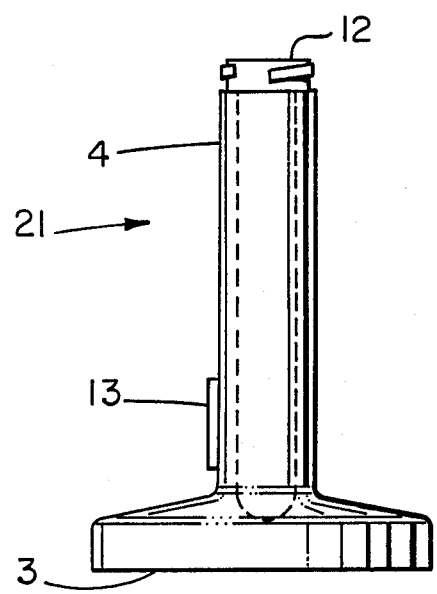
FIG. 3 is a side view of the mold plate and plunger sub-assembly.
Figure 5:
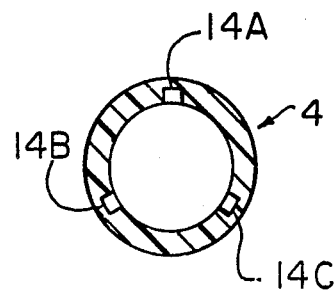
FIG. 5 is a bottom view of the mold cup taken along line IV—IV of FIG. 2.

Secured to plunger shaft 4 above shoulder 17 is a singular key, rib, pin protuberance or the like, 13 extending from the peripheral wall of the plunger which rib slidably engages into one of a series of grooves or keyways 14A, 14B and 14C inscribed in the internal wall of the sleeve 2. Each of the keyways 14 initiates at the junction of the sleeve 2 and taper 17 and extend axially along the interior wall 15 of the upper portion of the sleeve 2 terminating at various lengths, as illustrated in FIG. 4. In assembling the device, the plunger sub-assembly 21 is inserted in the sleeve sub-assembly 22 so that the rib 13 engages into one of the keyways 14. When so assembled, the plunger shaft 4 may slide vertically into the sleeve until the rib 13 contacts the terminus of the keyway in which the rib is engaged. In this manner the height of the mold plate 3 and consequently the thickness of the patty to be formed is determined. Obviously any number of keyways may be used so as to allow a variety of patty thicknesses.

OPERATION

Figure 6:
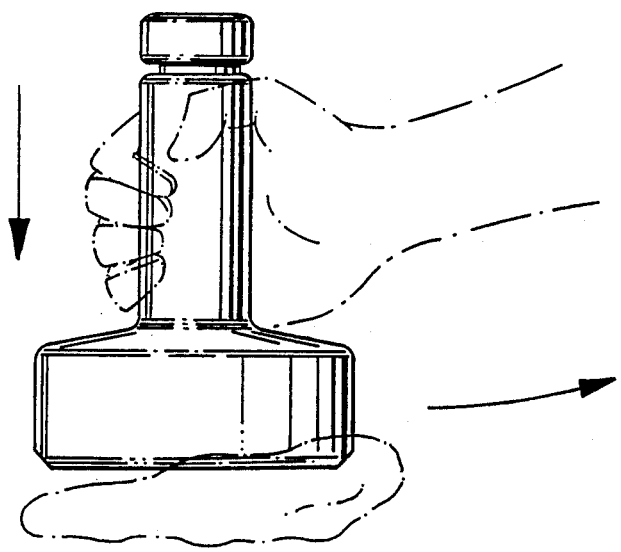
FIG. 6 illustrates the operation of forming a patty according to the invention.
Figure 7:
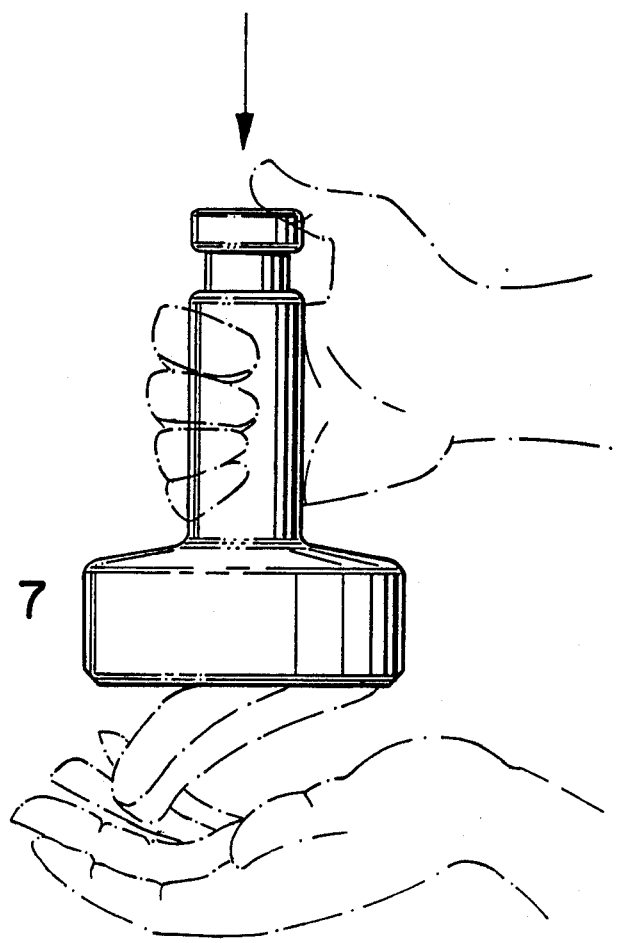
FIG. 7 illustrates the ejection of the patty from the apparatus according to the invention.

In operation, the retaining cap 5 is disengaged so as to allow the mold plate 3 to slide down through the sleeve sub-assembly and then rotated so that key 13 is aligned with the keyway 14 that corresponds to the thickness of patty desired. The plunger sub-assembly 21 is then pushed vertically into the sleeve member sub-assembly 22, and cap 5 is then screwed back on to plunger shaft 4. As shown in FIG. 6, the operator may then proceed to press the mold cup 1 onto a mound of ground meat which has been placed on the smooth, clean working surface. Pressure is applied downward on the mold and the meat is forced into and assumes the shape of the mold cup. This process is repeated, if necessary, until the entire cup is occupied. The bevelled edge 16 of the mold cup 1 serves to sever the patty from the remaining ground meat when the entire rim 6 is pressed against the working surface. The operator may then lift the apparatus away from the meat and depress retaining cap 5 to eject the patty from the mold as shown in FIG. 7. Once ejected the process may be repeated until the desired number of patties are obtained.

It will be evident that the invention may be modified so as to incorporate other desirable features or obvious extensions. For example, the keyways 14 may be inscribed in the exterior surface of the plunger shaft 4 with the key protruding from the interior surface of the sleeve handle 2. Alternatively, a set screw engaging threads on the grip sleeve 2 and extending into the bore of the sleeve may be substituted for the fixed rib or key. A resilient means, for example, a compression spring, may be used between the retaining cap 5 and the top edge 11 of the outer sleeve to hold the plunger at its uppermost position when the device is assembled. The device may also be used in commercial as well as domestic preparation. While the present invention has been discussed in the context of ground meat and hamburger patties the apparatus may be used with many other types of similar food, plastic or moldable materials.

The mold or the surfaces of the mold may be made of a non-absorbant, non-adherent material such as teflon or polypropylene to facilitate release of the patty and for ease of cleaning.

Various other modifications may readily occur to those skilled in the art, and the specific embodiment described should be taken as illustrative only and not as limiting the scope of the invention as defined in accordance with the accompanying claims.

I claim:

1. A tool for molding patties of variable thickness, comprising:
   (a) a tool body comprising a downwardly opening mold cup forming an interior space having vertical interior sides terminating along the lower edges thereof in a patty-severing edge, and a hollow vertical cylinder, the interior of said cylinder communicating with said interior space of said mold cup, the interior surface of said cylinder being provided with at least two vertical grooves of differing lengths and open at the lower ends thereof;
   (b) a patty-ejecting piston having a vertical shaft connected to a mold plate received within said tool body, said vertical shaft having an exterior diameter less than the interior diameter of said hollow cylinder of said tool body, said mold plate being connected to the lower end of said vertical shaft and having a lower patty-contacting surface the edges of which are dimensioned to slide in close communication with said vertical edges of said mold cup, and the exterior surface of said shaft having an extended rib sized to slide within said grooves in said hollow cylinder; and
   (c) stop means removably attached to said shaft of said piston for limiting the downward movement of said shaft in said hollow cylinder;

wherein when said stop means is attached to said shaft and said piston is in its extreme downward position, a portion of said rib remains in one of said grooves, and when said stop means is removed, said rib may slide freely from a groove for angular adjustment and alignment with a different groove.

2. The tool of claim 1 wherein said interior space of said mold cup is circular in horizontal cross section.

3. The tool of claim 1 wherein said stop means comprises a cap threadably received on the top end of said vertical shaft, said cap having an exterior diameter greater than the interior diameter of said hollow cylinder.

4. The tool of claim 1 wherein the lower open ends of said grooves are horizontally aligned adjacent the point of intersection of said interior space of said mold cup and said hollow interior of said cylinder.

5. A tool for molding patties of variable thicknesses comprising:
   (a) a tool body comprising a downwardly opening mold cup forming an interior space having vertical interior sides terminating along the lower edges thereof in a patty-severing edge, and hollow vertical cylinder, the interior of said cylinder communicating with said patty-molding space, the interior surface of said cylinder being provided with a vertical rib;
   (b) a patty-ejecting piston having a vertical shaft and a mold plate received within said tool body, said vertical shaft having an exterior diameter less than the interior diameter of said hollow cylinder of said tool body, said mold plate being connected to the lower end of said vertical shaft and having a lower patty-contacting surface with edges dimensioned to slide in close communication with said vertical edges of said mold cup, the exterior surface of said vertical shaft having at least two upwardly opening vertical grooves; and (c) stop means removably attached to said shaft of said piston for limiting the downward movement of said shaft in said hollow cylinder;

wherein when said stop means is attached to said shaft and said piston is in its extreme downward position, a portion of said rib remains in one of said grooves, and when said stop means is removed, said rib may slide freely from a groove for angular adjustment and alignment with a different groove.

6. The tool of claim 5 wherein said interior space of said mold cup is circular in horizontal cross section.

7. The tool of claim 5 wherein said stop means comprises a cap threadably received on the top end of said vertical shaft, said cap having an exterior diameter greater than the interior diameter of said hollow cylinder.

* * * * *

UNITED STATES PATENT AND TRADEMARK OFFICE
CERTIFICATE OF CORRECTION

PATENT NO. :  4,765,029
DATED       :  August 23, 1988
INVENTOR(S) :

It is certified that error appears in the above-identified patent and that said Letters Patent are hereby corrected as shown below:

In the address of the inventor "Van Couver" should read --Vancouver--.

Signed and Sealed this

Fourteenth Day of February, 1989

Attest:

DONALD J. QUIGG

*Attesting Officer*     *Commissioner of Patents and Trademarks*